INVENTORS
R. A. THATCH
F. D. WALDHAUER
BY Leonard D. Arnold
ATTORNEY

Sept. 22, 1970 R. A. THATCH ET AL 3,530,393

HIGH FREQUENCY GROUND ISOLATION FILTER FOR LINE POWERED REPEATER CIRCUITS

Filed March 11, 1968 3 Sheets-Sheet 2

United States Patent Office 3,530,393
Patented Sept. 22, 1970

3,530,393

HIGH FREQUENCY GROUND ISOLATION FILTER FOR LINE POWERED REPEATER CIRCUITS

Raymond A. Thatch, Middletown, and Frederick D. Waldhauer, Fair Haven, N.J., assignors to Bell Telephone Laboratories, Incorporated, Berkeley Heights, N.J., a corporation of New York Filed Mar. 11, 1968, Ser. No. 712,093
Int. Cl. H03f *1/00, 3/60*
U.S. Cl. 330—56 5 Claims

ABSTRACT OF THE DISCLOSURE

Multiple inductor-capacitor sections are placed in the feedback circuit between the input and output blocking capacitors of a line powered repeater. The inductance, provided by ferrite core sections placed around the outer surface of coaxial portions of the repeater, impedes the flow of spurious feedback current at high frequencies while leaving the signal current unaffected. Shunt capacitors, placed from repeater ground to earth ground between the ferrite core sections, divert the flow of feedback current away from the input.

BACKGROUND OF THE INVENTION

This invention relates generally to high frequency filtering circuits and, more particularly, to high frequency filtering circuits which isolate spurious feedback currents in communication repeaters supplied with signal and power from a common transmission facility.

In typical transmission systems well known to those skilled in the art, signal repeaters are placed at periodic points along a coaxial transmission cable to amplify the information signal between the transmitter and receiver. Since local sources of power are not conveniently available at these points, it is most efficient to power the repeaters by supplying a direct-current voltage on the same transmission cable with the information signal. In this manner a single high direct-current voltage source at the transmitter is used to supply a series of repeater circuits along the cable, and the need for separate power sources or separate power transmission facilities is eliminated.

Essentially, in this type of system the direct-current power component is separated from the alternating-current signal component at the input of each repeater. The signal component is fed directly to the amplifier circuit in the repeater, and the power component is fed to a power supply unit which provides a regulated direct-current voltage at a relatively low level to power the amplifier. The signal component will be increased because of the amplification process and the power component will be decreased because of the portion used to supply the amplifier circuit. At the output, the signal and power components are recombined for transmission on the cable to the next repeater in the series.

The powering of a series of repeaters in this manner effectively requires that the ground potential of the amplifier circuit be separated from the ground potential of the transmission cable. Otherwise, the high direct-current supply voltage from the transmission cable would appear across the bypass capacitors in the amplifier circuit. This high voltage hinders the operation of the bypass capacitors and thereby introduces unwanted distortion into the amplifier signal.

In order to separate the two ground potentials the repeater contains an inner and outer casing. The outer casing is connected to the outer conductor of the coaxial transmission cable and is maintained at one direct-current reference potential, referred to as cable ground or earth ground. The inner casing, which forms the chassis for the amplifier circuit, is maintained at another direct-current reference potential, referred to as repeater ground or repeater chassis ground. Direct-current blocking capacitors are then connected between the two ground potentials at the input and output of the amplifier circuit to maintain a direct-current potential difference between repeater ground and cable ground while providing an input and output alternating-current transmission path for the information signal.

The problem inherent in the arrangement described above is that in practice no capacitor can provide an impedance free path for the information signal. As a result of the impedance of the output blocking capacitor, a spurious feedback signal flows between the inner and outer casings to the input blocking capacitor. This feedback signal adds in series with and distorts the arriving information signal which also passes through the input blocking capacitor.

In the attempt to isolate the spurious feedback current, various filtering methods have been devised to supplement or replace the simple blocking capacitor. These filters consist of a variety of lumped circuit elements, such as capacitors, inductors and transformers. While many of these circuits are relatively complex, for the most part at low frequencies they perform satisfactorily. At frequencies in excess of 1 to 10 mHz., however, the lumped circuit elements do not perform as desired. In practice, for example, an inductor contains some parasitic capacitance, which at high frequencies changes the characteristics of the element. This improper operation of the circuit elements reduces the effectiveness of the typical filter circuits shown in the prior art and increases the high frequency distortion of the information signal because of the increased feedback current which reaches the input of the repeater.

When high gain amplifiers are used, the flow of feedback current increases and the distortion effect becomes more pronounced. In time division transmission systems, for example, the effective gain of each regenerative amplifier is commonly very high, in the order of 60 db, and the frequency of the incoming pulse signal is also very high, in the order of 100 mHz. With the increased feedback distortion resulting from the high gain and the high frequency, a greater number of repeaters must be used at shorter distances along the transmission cable to insure faithful reproduction of the original transmitted pulse signal. This requirement of more repeaters increases the cost and reduces the efficiency of the system.

It is accordingly the object of the present invention to provide a simple, compact, and economical ground separation filter which will operate effectively at high frequencies, including those in excess of 1,000 mHz., to reduce the flow of spurious feedback signals.

SUMMARY OF THE INVENTION

In accordance with the present invention, as shown in the embodiment in FIG. 1, the input and output ports of the repeater chassis are made coaxial in structure. The input and output blocking capacitors 40 and 41 are connected from the ends of these ports to the outer casing 12. By taking advantage of the conduction characteristics of the coaxial ports at high frequencies, a low-pass filter is constructed, as described below, that operates in the feedback circuit to divert the feedback current away from the input blocking capacitor 40, while leaving the current in the signal circuit unaffected.

Generally, as a result of the so-called "skin effect" at high frequencies, all current flows on the surface of a metal and the electromagnetic potential on the inside of the metal is zero. More particularly, in a coaxial transmission facility at high frequencies the alternating signal current flows on the outer surface of the center conductor and induces an equal and opposite return current on the inner surface of the outer conductor. The electromagnetic potential on the inside of the outer conductor is zero. It may be noted at this point that the distinction between the inside of the outer conductor and the inner surface of the outer conductor should be kept in mind in the discussion below.

By the same principles, in the present invention the signal and return currents in the coaxial ports of the repeater chassis are equal and opposite at high frequencies; the signal current flows on the outer surface of the center conductor and the return current flows on the inner surface of the outer conductor. Again the electromagnetic potential inside of the outer conductor is zero. Because of this, the feedback current in the coaxial portions of the repeater chassis must flow on the outer surface of the outer conductor. The flow of feedback current in a separate path on the outer surface produces a net electromagnetic field around that surface. Since the electromagnetic potential inside of the outer conductor is zero, a ferromagnetic core placed around the outer surface will produce a back electromagnetic field and act as an inductor in series with the feedback current to impede its flow while leaving the return current on the inner surface of the coaxial unaffected. Theoretically, the impendance of this core inductor could be made large enough to keep the feedback current within tolerances but there are practical limitations, such as the size of the core, that hinder its effectiveness.

In one embodiment of this invention as shown in FIG. 1, multiple cores are placed in tandem around the coaxial ports of the repeater chassis and shunt capacitors are placed between the cores from the repeater chassis to the outer casing. The core inductors impede the flow of feedback current and the shunt capacitors divert the flow away from the input. Together the multiple core-capacitor sections operate in effect as a low-pass filter. Since the filtering effect of this arrangement can be increased by adding more sections, the feedback current appearing at the input of the repeater may be reduced to an arbitrarily low level, even when the gain of the repeater is high. Moreover, it has been found that this filter operates effectively in a range of frequencies starting below 100 kHz. and exceeding 1,000 mHz.

In another embodiment of the invention portions of the outer casing are also made coaxial in structure and provided with inductive cores. As shown in FIG. 3, the shunt capacitors are connected between the cores on the coaxial ports of repeater chassis and the cores on the inner casing. The arrangement shown operates in the same manner as described above, except that with the added cores on the outer casing a more effective filter is produced to divert the spurious feedback current away from the input blocking capacitor.

DETAILED DESCRIPTION

Figure 1:
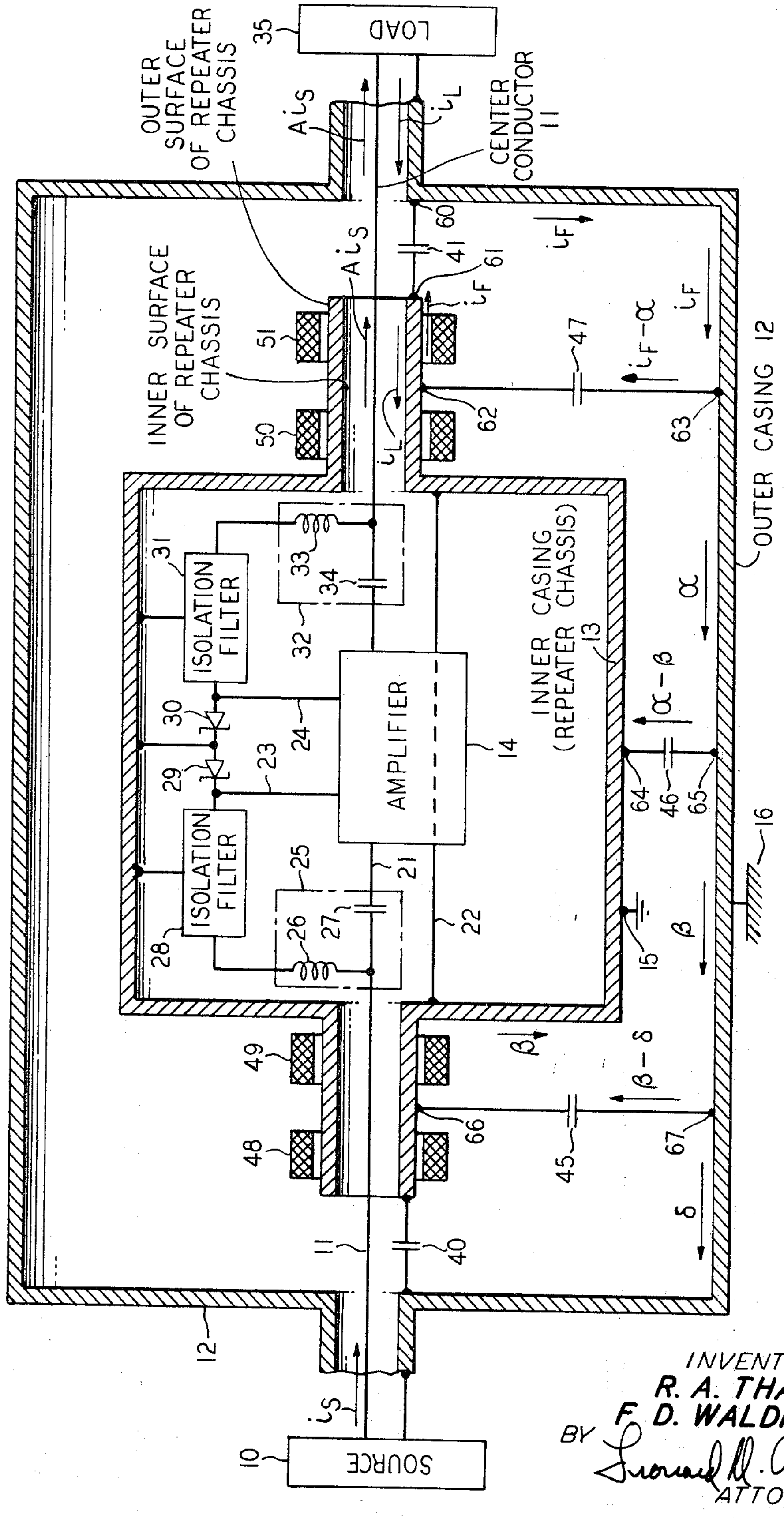
FIG. 1 is a partially pictorial and partially schematic diagram of a repeater embodying the invention.

The repeater shown in FIG. 1 is supplied with a direct-current power component and an alternating signal current through center conductor 11 from source 10. The function of the repeater is to amplify the alternating signal component and to use the direct-current component as a source of power. In a complete transmission system a number of these repeaters appear at periodic points along a transmission cable between the transmitter and repeater. In such a system source 10 represents the incoming coaxial transmission cable from a distant transmitter and the load 35 represents the receiver or the next repeater in the series.

Generally, to perform its function, outer casing 12 of the repeater is maintained at one direct-current reference potential 16, called cable ground or earth ground, and inner casing 13 is maintained at another direct-current reference potential 15 called repeater ground or chassis ground. Inner casing 13 is also referred to as the repeater chassis because it forms a chassis for the amplifier circuit 14, which amplifies the signal component applied at inputs 21 and 22. Power is supplied to amplifier circuit 14 through input leads 23 and 24.

As described in detail below, there are two divergent current paths within the repeater shown in FIG. 1. One, for the power component, proceeds from center conductor 11 through filters 25, 28, 31, and 32 to load 35 and returns through outer casing 12. The other, for the alternating signal component $i_s$, proceeds from source 10 through capacitor 27 to the input of amplifier circuit 14 and returns through inner casing 13 and capacitor 40 to source 10. The amplified signal component $Ai_s$ at the output of amplifier circuit 14 passes through capacitor 34 to load 35 and returns through capacitor 41 and inner casing 13.

The signal and power components are separated in separation filter 25 in order to supply the signal at inputs 21 and 22 and the power at inputs 23 and 24 to amplifier 14. In separation filter 25 the alternating signal component is blocked by inductor 26 and passed through capacitor 27 to the inputs 21 and 22, and the power component is blocked by capacitor 27 and passed through inductor 26 to isolation filter 28. Zener diodes 29 and 30 at the output of filter 28 provide a regulated voltage at inputs 23 and 24 to power amplifier circuit 14. The power component is then passed through isolation filter 31 and separation filter 32 and returned to center conductor 11 to recombine with the amplified signal component at the output of amplifier circuit 14. In separation filter 32 the amplified signal component from amplifier circuit 14 is passed through capacitor 34 and blocked by inductor 33 and the power component from isolation filter 31 is passed through inductor 33 and blocked by capacitor 34. Thus, at the output of power separation filter 32 the direct-current component and the alternating signal component are recombined for transmission to the load 35 or the next repeater in the series. The direct-current component is reduced by a small amount which was used to power amplifier 14 and the signal component is increased by the amplification factor A.

Capacitors 40 and 41 are connected between outer casing 12 and inner casing 13 to provide an alternating-current return path for the information signal at the input and output of amplifier circuit 14. Specifically, capacitor 40 provides a return path for the signal from source 10 to the input of amplifier circuit 14 and capacitor 41 provides a return path for the signal from the output of amplifier 14 to the load 35. Both blocking capacitors 40 and 41 block the relatively high direct-current power component from source 10 from appearing across the inputs 21 and 22 of amplifier circuit 14. As indicated above, the only direct-current voltage used to power amplifier circuit 14 was the relatively low regulated voltage supplied to inputs 23 and 24 by Zener diodes 29 and 30. Outer casing 12 provides a separation path for the direct-current supply voltage from source 10 to load 35, so that the direct-current voltage from source 10 is reduced only by the relatively small amount used to power amplifier 14.

In practical working systems blocking capacitors 40 and 41 cannot provide an impedance free path for the alternating return current at the input and output of the repeater circuit. Because of this impedance, spurious feedback current flows from output blocking capacitors 41 through outer casing 12, input blocking capacitor 40, and inner casing 13. The flow of feedback current causes a voltage drop across capacitor 40, which adds in series with the signal return current from source 10. This addition of the feedback voltage across capacitor 40 causes distortion in the signal at the input of amplifier circuit 14.

At high frequencies the parasitic inductance associated with capacitors 40 and 41 causes an increase in their impedance and an increase in the flow of feedback current. In addition, if high gain amplifiers are used in amplifier circuit 14, more signal current flows through output blocking capacitor 41. Because of the impedance of capacitor 41, this increase in signal current, in turn, causes more feedback current to flow to input blocking capacitor 40.

In the embodiment of the invention shown in FIG. 1 the input and output ports of the repeater chassis are made coaxial in structure to take advantage of the coaxial's conductive characteristics at high frequencies. By using this structure in conjunction with a plurality of capacitors and core sections, illustrated by capacitors 45, 46 and 47 and ferromagnetic cores 48, 49, 50 and 51, the feedback current flowing through blocking capacitors 40 and 41 may be reduced to an arbitrarily low level. As is described in more detail below, the cores 48, 49, 50 and 51 impede the flow of feedback current and the shunt capacitors 45, 46 and 47 divert the flow of feedback current away from the input blocking capacitor 40.

Figure 2:
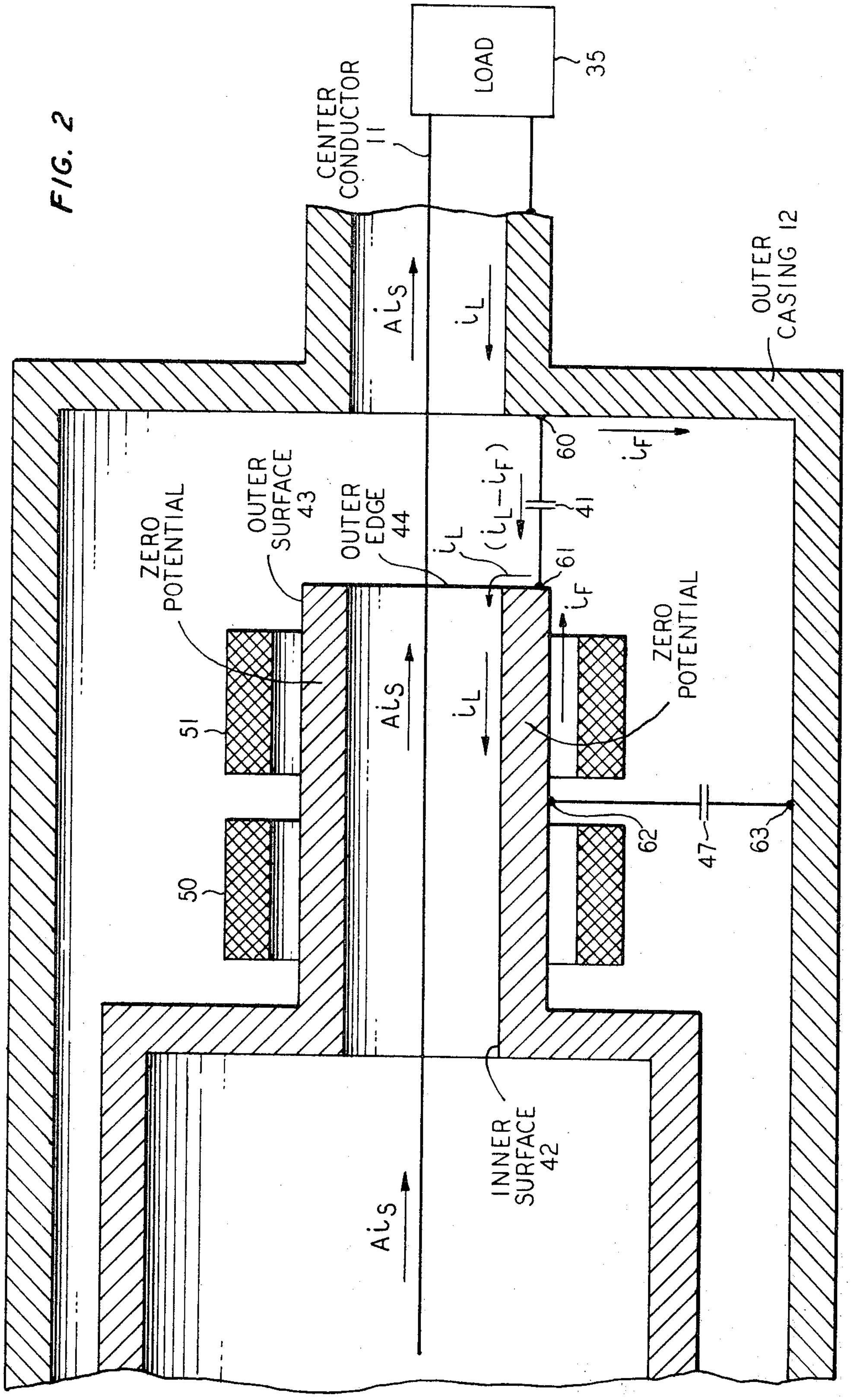
FIG. 2 is a section diagram of the output portion of the repeater shown in FIG. 1.

For purposes of illustration, FIG. 2 shows an expanded picture of the output port of the repeater chassis shown in FIG. 1. It may be appreciated, however, that since the repeater shown in FIG. 1 is symmetrical, the structure and description given for the output port applies equally well for the input.

Because of the so-called "skin effect" the amplified signal current $Ai_S$ is equal and opposite to the load return current $i_L$ on the inner surface 42 of the coaxial portion of the repeater chassis shown in FIG. 2. The electromagnetic potential and the net electromagnetic field inside of the coaxial port is zero. Thus, the feedback current $i_F$ must flow on the outer surface 43. This separate flow of feedback current produces a net electromagnetic field around the outer surface 43 of the coaxial port shown in FIG. 2 so that ferromagnetic cores 50 and 51 make outer surface 43 behave as a series of inductors which impede the flow of feedback current $i_F$ while leaving the signal and load return currents $Ai_S$ and $i_L$ unaffected. As shown in FIG. 2, $i_F$ divides from $i_L$ at junction 60 and flows along the outer casing 12. At junction 61, $i_F$ rejoins current ($i_L - i_F$) to produce the current $i_L$ which flows along the outer edge 44 to the inner surface 42 of the output coaxial port.

FIG. 1 shows a complete picture illustrating the flow of feedback current from the output blocking capacitor 41 to input blocking capacitor 40. At point 60 the return current $i_L$ from load 35 divides. Most of the current $i_L$ flows back to the repeater chassis 13 through blocking capacitor 41. The remainder of the current designated as the feedback current $i_F$ flows along the path in outer casing 12. If the inductance provided by cores 48, 49, 50 and 51 and the capacitors 45, 46 and 47 were not present all of this feedback current $i_F$ would flow through the input blocking capacitor 40 to the input port of the repeater chassis. This feedback current would return to the output port through the path along the repeater chassis 13 and join the current $i_L$ at point 61. When the feedback current flows through blocking capacitor 40 a voltage is generated, which adds with the signal voltage from source 10. This voltage causes distortion at the input of the amplifier circuit 14 and reduces the quality and efficiency of the system.

Capacitors 45, 46 and 47 and ferromagnetic cores 48, 49, 50 and 51 impede and divert the flow of feedback current away from the input blocking capacitor 40 by dividing the feedback current at junctions 63, 65 and 67. This division process can be described in the following manner. Viewing the current $i_F$ at junction 63, there are two possible paths for it to arrive at junction 62. One path is directly through capacitor 47 and the other path is through capacitor 46 inductive core 50. Since capacitor 47 offers much less impedance to the alternating feedback current at high frequencies, most of the current, about 95% for example, flows directly through capacitor 47 to junction 62 and only a small portion, designated as $\alpha$, flows to junction 65. Again, at junction 65 there are two possible paths for the current to reach junction 64. One is directly through capacitor 46, and the other is through capacitor 45 and the inductance provided by core 49. Since capacitor 46 offers little impedance and the inductance provided by core 49 offers much higher impedance, about 95% will flow through capacitor 46. Only a small portion, designated as $\beta$, flows to junction 67. Similarly, the same dividing process occurs at junction 67, where again 95% of the feedback current flows through shunt capacitor 45. Thus, only a very small portion of the original feedback current $i_F$, herein designated as $\delta$, flows back through the blocking capacitor 40. In this instance, with four cores and three shunt capacitors, the feedback current flowing through blocking capacitor 40 is .05 x .05 x .05 of the original current $i_F$. It can be seen, therefore, that by adding more cores and capacitors the feedback current is in a very simple manner reduced to an arbitrary limit. In effect, the multiple core capacitor sections operate as a low-pass filter to impede and divert the flow of the high frequency feedback current.

Since the repeater shown in FIG. 1 is a symmetrical structure, the description given above for the flow of feedback current from output to input applies equally well for the feedback currents flowing from input to output. Because of this symmetry, amplifier 14 may be any of a number of well known 2-way amplifiers. As another variation, amplifier 14 may be a regenerative type amplifier for use in high speed time division communication systems.

Isolation filters 28 and 31 may be any of a number of low-pass filters well known to those skilled in the art. Their function is merely to prevent feedback currents from flowing between the power separation filters 25 and 32. As described above, Zener diodes 29 and 30 each supply a regulated direct-current voltage between power inputs 23 and 24. In a typical working system wherein amplifier 14 is a transistor type amplifier, each of the Zener diodes 29 and 30 supplies six volts with respect to repeater chassis 15. Thus, the total direct-current voltage supplied between power inputs 23 and 24 of amplifier 14 will be approxiamtely twelve volts.

Figure 3:
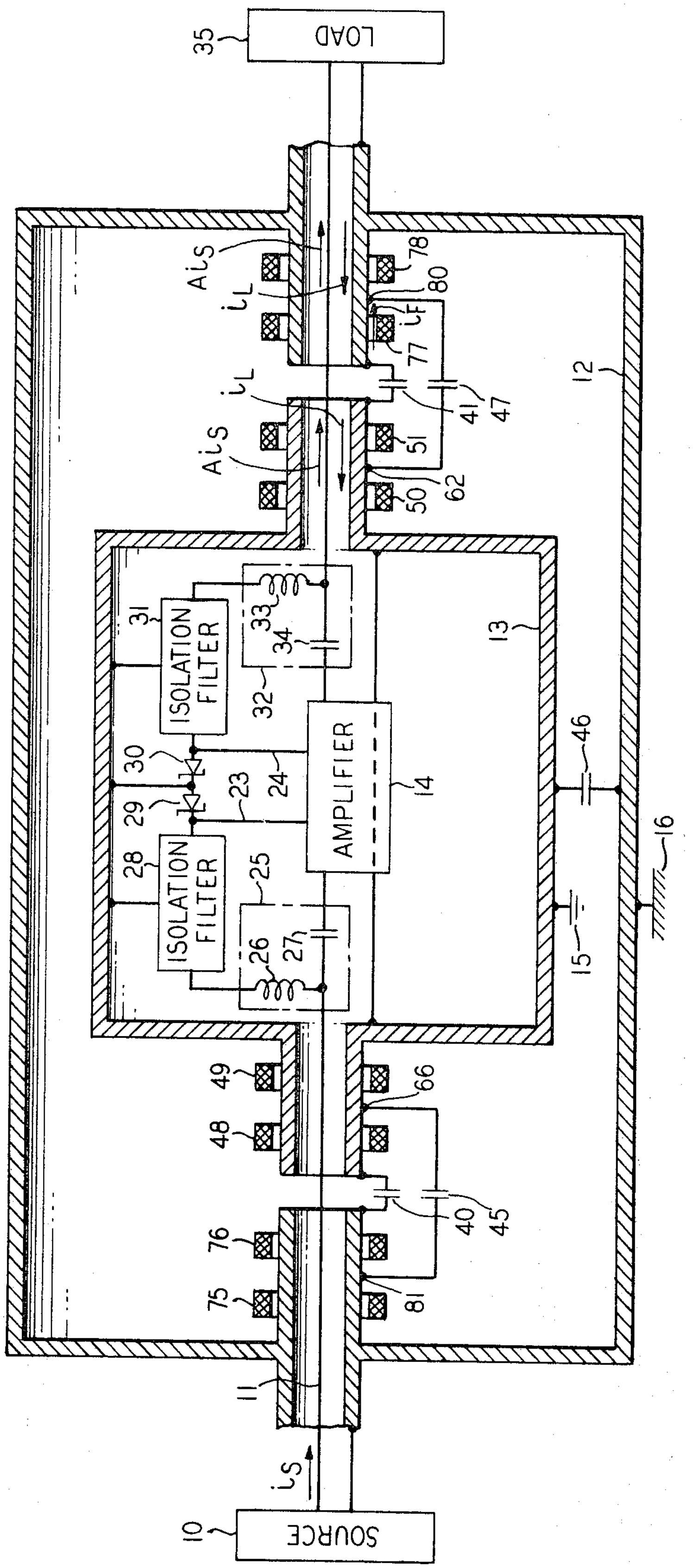
FIG. 3 is a partially pictorial and partially schematic diagram of a repeater using an alternative embodiment of the invention.

In the embodiment of the invention shown in FIG. 3 portions of the outer casing 12 are made coaxial in structure. The elements shown in FIG. 3 correspond to the identically numbered elements shown in FIG. 1. Cores 75 and 76 have been added around the coaxial portion of the outer casing at the input of the repeater and cores 77 and 78 have been added around the coaxial portions of the outer casing at the output of the repeater. Cores 75, 76, 77 and 78 operate in the same manner as the cores 48, 49, 50 and 51 described above. Junctions 63 and 67 from capacitors 47 and 45 in FIG. 1 correspond to junctions 80 and 81 in FIG. 3. As may be appreciated, the connections for capacitors 45 and 47 are made between the cores 75, 76, 77 and 78 as shown so that an additional current dividing effects is produced. Thus, for example, when the feedback current, $i_F$, approaches junction 80 in FIG. 3, there are essentially two paths it can use to reach junction 62. One is directly through capacitor 47 and the other is through core 78, capacitor 46 and core 50. Most of the current will flow through capacitor 47 because of its lower impedance. It can be seen therefore that the arrangement shown in FIG. 3 operates as a more effective filter because of the greater number of cores in the feedback path.

In conclusion it may be noted that without departing from the spirit and scope of the invention, any portion of the repeater chassis or the outer casing may be coaxial in structure. Furthermore, capacitors 45, 46 and 47 may be used either with cores 48, 49, 50 and 51, as shown in FIG. 1, or with cores 75, 76, 77 and 78, as shown in FIG. 3, along either of those coaxial portions to produce the filtering effect described in detail above.

What is claimed is:

1. A high frequency ground separation filter for isolating a first electrical network having a first direct-current reference potential from a second electrical network having a second direct-current reference potenial, said ground separation filter comprising:

coaxial cable means having an input and an output and an inner and outer conductor, said input connected to said first network at said first direct-current reference potential and the output of said inner conductor connected to said second network, coupling means connected between said output of said outer conductor and said second network for maintaining the direct-current potential difference between said first and second networks and for providing an alternating-current signal path from said first to said second network, said alternating current signal flowing at high frequencies on the outer surface of said inner conductor and on the inner surface of said outer conductor and causing spurious feedback currents to flow on the outer surface of said outer conductor, multiple inductive cores placed around the outer surface of said outer conductor so as to coact with the flux of said spurious currents and impede the flow of said currents on said surface while leaving said alternating current signal substantially unaffected, multiple shunt capacitors, each of said capacitors connected adjacent to one of said cores from said outer conductor to said second direct-current reference potential to divert the flow of spurious currents away from said alternating current signal flowing to said second network through said coupling means.

2. In combination:

a repeater circuit with a casing partly coaxial in structure, having an input and an output, and requiring an external power supply, a source of a direct current supply voltage and an alternating-current signal, said source being maintained at a first direct-current reference potential, input means for applying both said alternating-current signal and said direct-current supply voltage to the input of said repeater circuit, output means for providing a transmission path from the output of said repeater circuit, first and second capacitors connected respectively between the input of said repeater circuit and said input means and the output of said repeater circuit and said output means for maintaining said repeater circuit at a second direct-current reference potential while providing an alternating-current path at the input and output of said repeater circuit and resulting in the formation of a feedback current path through said first and second capacitors from said output to said input of said reepater circuit, and filtering means to reduce the feedback current flowing through said first capacitor and affecting the alternating current signal at the input of said repeater circuit, said filtering means comprising multiple sections, each of said sections including a third capacitor and an inductive core placed in relation to said coaxial portion of said repeater so that said cores in said sections coact with the magnetic flux of said feedback current to impede the flow of said current and cause said current to be directed through said capacitors in said sections.

3. A ground separation filter for controlling the flow of spurious feedback current in a repeater supplied with signal and power from a common source, said repeater having an input and an output and an inner and an outer casing with a portion of one of said casings having a coaxial structure, said ground separation filter comprising, first and second direct-current blocking capacitors connected between said inner and outer casings for providing a signal path at the input and output of said repeater and resulting in the formation of a feedback path between said inner and outer casings, multiple inductive cores placed in relation to said coaxial portion of said casing so as to coact with the flux of said feedback current and thereby impede the flow of said current, and multiple shunt capacitors connected from said inner to said outer casing between said cores to divert the flow of feedback current so that said signal is not distorted.

4. A ground separation filter for controlling the flow of spurious feedback current in a repeater circuit supplied with signal and power from a common source, said repeater circuit having an input and an output and an inner and an outer casing, a portion of said inner casing having a coaxial structure, said ground separation filter comprising:

first and second direct-current blocking capacitors connected between said inner and outer casings for providing an alternating current signal path at the input and output of said repeater circuit and resulting in the formation of a feedback current path passing through said first and second capacitors and along said inner and outer casings from the output to the input of said repeater circuit, said feedback current flowing on the outer surface of said coaxial portion of said inner casing, multiple inductive cores placed around the outside of said coaxial portion of said inner casing so as to coact with the flux of said feedback current and impede the flow of said current while leaving the flow of signal current in said signal path unaffected, and multiple shunt capacitors connected from said inner to said outer casing between said cores to divert the flow of feedback current away from said first block capacitor and the input of said repeater circuit so that said signal is not distorted.

5. A ground separation filter for controlling the flow of spurious feedback current in a repeater circuit supplied with signal and power from a common source, said repeater circuit having an input and an output and being supplied with an inner and an outer casing, a portion of said outer casing having a coaxial structure, said ground separation filter comprising:

first and second direct-current blocking capacitors connected between said inner and outer casings for providing an alternating current signal path at the input and output of said repeater circuit and resulting in the formation of a feedback current path passing through said first and second capacitors and along said inner and outer casings from the output to the input of said repeater circuit, said feedback current flowing on the outer surface of said coaxial portion of said outer casing, multiple inductive cores placed around the outside of said coaxial portion of said outer casing so as to coact with the flux of said feedback current and impede the flow of said current while leaving the flow of signal current in said signal path unaffected, and multiple shunt capacitors connected from said inner to said outer casing between said cores to divert the flow of feedback current away from said first blocking capacitor and the input of said repeater circuit so that said signal is not distorted.

References Cited

UNITED STATES PATENTS

| | | | |
|---|---|---|---|
| 2,803,710 | 8/1957 | Bradburd | 330—56 |
| 3,017,577 | 1/1962 | Kostelnick | 330—56 |
| 3,254,303 | 5/1966 | Brewer et al. | 330—22 |
| 3,437,947 | 4/1969 | Beekman | 330—56 X |

NATHAN KAUFMAN, Primary Examiner

U.S. Cl. X.R.

330—199